United States Patent [19]

Pritchard

[11] 4,087,732

[45] May 2, 1978

[54] DIGITAL STEPPING MOTOR DEVICE CIRCUIT

[76] Inventor: Eric K. Pritchard, Bowie, Md.

[21] Appl. No.: 688,628

[22] Filed: May 21, 1976

[51] Int. Cl.² ............................................. G05B 19/40
[52] U.S. Cl. ...................................... 318/696; 318/685
[58] Field of Search ................. 318/685, 696, 138, 254

[56] References Cited

U.S. PATENT DOCUMENTS

| | | | |
|---|---|---|---|
| 3,445,741 | 5/1969 | Gerber | 318/696 |
| 3,750,000 | 7/1973 | Bruckner et al. | 318/696 |
| 3,777,246 | 12/1973 | Barnes | 318/696 |
| 3,842,332 | 10/1974 | Heine et al. | 318/696 |
| 3,885,210 | 5/1975 | Burnett | 318/696 |
| 3,906,319 | 9/1975 | Milligan | 318/318 |
| 3,909,693 | 9/1975 | Yoshitake et al. | 318/696 |
| 3,919,608 | 11/1975 | Usami et al. | 318/138 |

Primary Examiner—Robert K. Schaefer
Assistant Examiner—John J. Feldhaus
Attorney, Agent, or Firm—Harold Huberfeld

[57] ABSTRACT

A control circuit for a stepping motor is provided which rotates the motor armature in such a manner as to minimize motor resonance while not appreciably reducing the motor torque at high speeds. The circuit includes means for receiving an input signal indicative of the desired direction and rate of motor travel and means responsive to the input signal for developing a position command signal which is a multi-step function having a maximum and a minimum level and wherein all steps are of equal amplitude but wherein at least one step between said maximum and minimum levels has a duration which is unequal to that of another step. Finally, the circuit includes means responsive to the position command signal for developing an energization signal for the stepping motor.

10 Claims, 4 Drawing Figures

DIGITAL STEPPING MOTOR DEVICE CIRCUIT

BACKGROUND OF THE INVENTION

The present invention relates generally to stepping motor control circuits and more particularly to circuits for controlling the energization of stepping motors in less than full steps.

In stepping motors it is common to energize the field windings of a motor in a sequential step-by-step manner which will cause the armature of the motor to rotate in a correspondingly step-by-step manner. Additionally, a number of circuits have been designed to drive a stepping motor in half steps. To improve stepping resolution, U.S. Pat. No. 3,445,741 to Gerber discloses a technique for producing fractional steps to control a stepping motor. This system requires that for producing N sub-steps in a four phase stepping motor, 2N output transistors and associated logic circuitry must be utilized. Thus, in order to produce very fine steps, this circuit becomes quite complex. The control logic forces the formation of a trapezoidal waveform, composed of steps of equal amplitude and equal duration.

U.S. Pat. No. 3,885,210 to Burnett and U.S. Pat. No. 3,909,693 to Yoshitake et. al., disclose stepping motor drive circuits which form a trapezoidal waveform wherein the steps are of unequal amplitude but of equal duration. Both the Gerber, the Burnett, and the Yoshitake et. al., stepping motor control circuits drive the motor with trapezoidal current waveforms which produce varying holding torques over the mini-steps within a step. A mini-stepping motor control drive circuit should produce motor motion in steps of equal amplitude with the same holding torque at each step for greater torque capability and rotation smoothness. Since the motor operates in sinusoidal relationships, the current waveforms should preferably be sinusoidal, and not trapezoidal. Since the motor also has non-linearities, the sinusoid must be altered to compensate for these non-linearities. For a further discussion of this problem see Applicant's U.S. Pat. Application Ser. No. 501,891, filed Aug. 30, 1974.

SUMMARY OF THE INVENTION

The present invention overcomes the aforementioned difficulties by providing a control circuit for a stepping motor which rotates the motor armature in such a manner as to minimize motor resonance while not appreciably reducing the motor torque at high speeds. The circuit includes means for receiving an input signal indicative of the desired direction and rate of motor travel and means responsive to the input signal for developing a position command signal which is a multi-step function having a maximum and a minimum level and wherein all steps are of equal amplitude but wherein at least one step between said maximum and minimum levels has a duration which is unequal to that of another step. Finally, the circuit includes means responsive to the position command signal for developing an energization signal for the stepping motor.

OBJECTS OF THE INVENTION

Accordingly, an object of the present invention is the provision of a control circuit for a stepping motor which will minimize motor resonance while not appreciably reducing motor torque at high speeds.

Another object of the present invention is the provision of a control circuit for a stepping motor which is capable of driving the motor armature in fine steps and in which the complexity of the output stage is independent of the number of steps.

A further object of the present invention is the provision of a control circuit for a stepping motor which will create a fairly constant holding torque over the sub-steps within a full step.

Still another object of the present invention is the provision of a control circuit for a stepping motor which is relatively simple and therefore inexpensive to manufacture.

Other objects, advantages, and novel features of the present invention will become apparent from the following detailed description of the invention when considered in conjunction with the accompanying drawings.

DESCRIPTION OF THE PREFERRED EMBODIMENT

Figure 1:
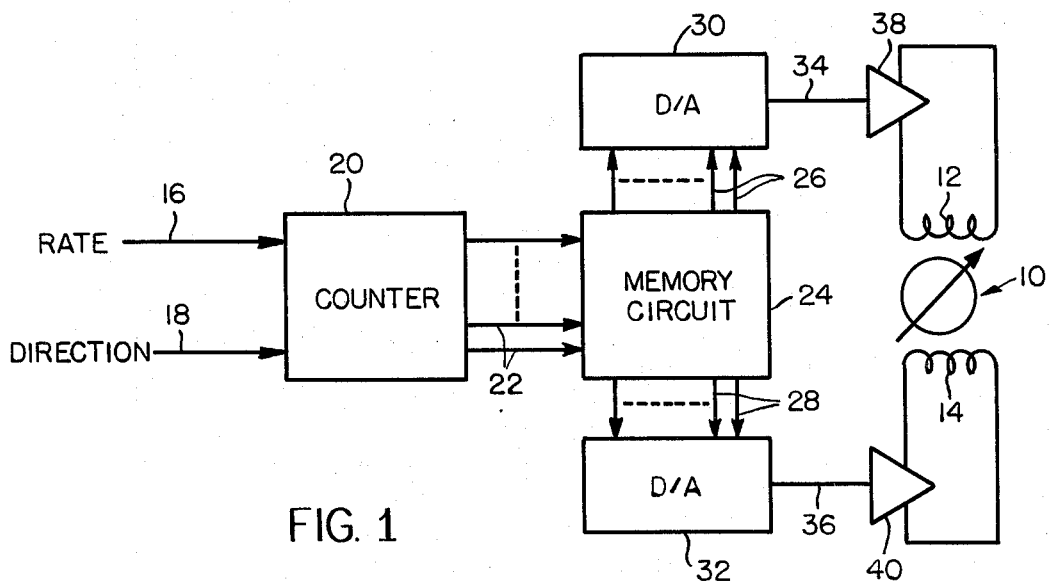
FIG. 1 shows the stepping motor control circuit of the present invention in block diagram form.

The stepping motor control circuit of the present invention will now be described in connection with FIGS. 1 through 4. FIG. 1 shows a control circuit for a stepping motor 10 having control windings 12 and 14, respectively. For purposes of illustration, a four phase motor is shown, although the circuit of the present invention can be utilized with any stepping motor. The circuit receives signals 16 and 18 indicative of the desired rate and direction of motor travel, respectively, from an external source. A counter 20 receives signals 16 and 18 and delivers a plurality of output signals 22 to a memory circuit 24. The memory circuit 24 includes logic circuitry which relates the desired motor position to the necessary motor current. Accordingly, in response to the counter output signals 22, the memory circuit 24 delivers output signals 26 and 28 to digital to analog converters 30 and 32, respectively. The digital to analog converters 30 and 32 convert the digital outputs 26 and 28 into multi-level digital position command signals 34 and 36, respectively. The position command signals 34 and 36 are delivered to power amplifiers 38 and 40, respectively. The outputs of power amplifiers 38 and 40 are connected to motor windings 12 and 14, respectively, to in turn drive the motor 10.

For reasons which will become apparent in the ensuing discussion, it is important that the memory circuit 24 and the digital to analog converters 30 and 32 be responsive to the counter output signals 22 to produce position command signals 34 and 36 which are multi-step functions having a maximum and a minimum level and wherein all of the steps are of equal amplitude but wherein at least one of the steps between said maximum and minimum levels has a duration which is unequal to that of another step. In the design of stepping motor control circuits, it has been found that maximum inherent low pass filtering action of the stepping motor can be obtained by changing the motor current in many small sized steps. The size of the steps in the control circuit of the present invention is limited by the resolution of the memory circuit 24 and the digital to analog converters 30 and 32. Thus, for example, the counter 20 may include a binary coded divide by ten counter followed by a binary coded divide by six counter. Of course the larger the division the greater the low pass filtering action and the motor shaft position accuracy that may be obtained.

Figure 3:
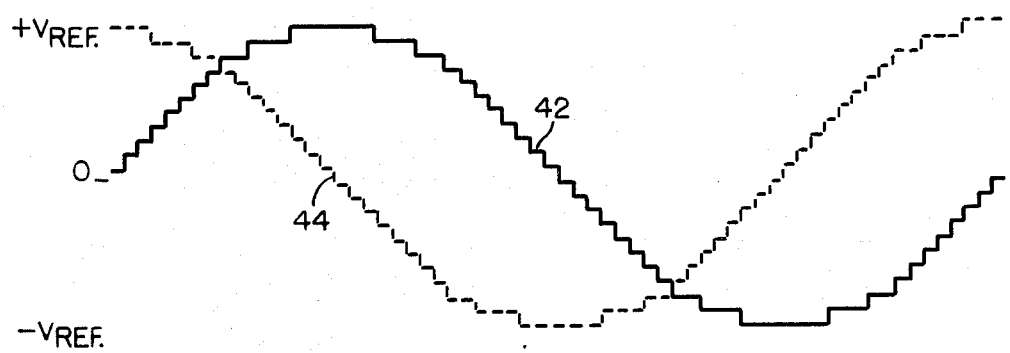
FIG. 3 shows an output waveform at a point in the circuit of FIG. 1.

The memory circuit 24 may be a read-only memory. Since the input-output relationship of a read-only memory cannot be altered after manufacture, it is equivalent to a combinatorial logic circuit. The input-output relationship of the memory or its logic substitute as mapped in Table 1 will yield motor current curves as shown in FIG. 3. It is logically convenient to generate symmetrical waveforms, and consequently it is noted that the current level closest to zero is actually one-half step away. In this manner the first step above zero is symmetrical to the first step below zero and the difference in their levels is one step. As is apparent from Table 1 the logic circuit in memory circuit 24 has an output state which is directly dependent on input signals 22 for developing a digital output signal which varies in response to a first predetermined set of input signals, but remains constant in response to a second predetermined set of input signals. For example, for addresses zero through seven the digital to analog converter 30 value varies two units per pulse. However, for addresses eight and nine there is no variation in the digital to analog converter 30 value.

TABLE I

| ADDRESS | DAC 30 INPUT | DAC 32 INPUT | DAC 30 VALUE | DAC 32 VALUE |
|---|---|---|---|---|
| 000000 | 000001 | 010101 | 1 | 21 |
| 000001 | 000011 | 010101 | 3 | 21 |
| 000010 | 000101 | 010101 | 5 | 21 |
| 000011 | 000111 | 010011 | 7 | 19 |
| 000100 | 001001 | 010011 | 9 | 19 |
| 000101 | 001011 | 010011 | 11 | 19 |
| 000110 | 001101 | 010001 | 13 | 17 |
| 000111 | 001111 | 010001 | 15 | 17 |
| 001000 | 010001 | 001111 | 17 | 15 |
| 001001 | 010001 | 001101 | 17 | 13 |
| 001010 | 010011 | 001011 | 19 | 11 |
| 001011 | 010011 | 001001 | 19 | 9 |
| 001100 | 010011 | 000111 | 19 | 7 |
| 001101 | 010101 | 000101 | 21 | 5 |
| 001110 | 010101 | 000011 | 21 | 3 |
| 001111 | 010101 | 000001 | 21 | 1 |
| 010000 | 010101 | 111111 | 21 | −1 |
| 010001 | 010101 | 111101 | 21 | −3 |
| 010010 | 010101 | 111011 | 21 | −5 |
| 010011 | 010011 | 111001 | 19 | −7 |
| 010100 | 010011 | 110111 | 19 | −9 |
| 010101 | 010011 | 110101 | 19 | −11 |
| 010110 | 010001 | 110011 | 17 | −13 |
| 010111 | 010001 | 110001 | 17 | −15 |
| 011000 | 001111 | 101111 | 15 | −17 |
| 011001 | 001101 | 101111 | 13 | −17 |
| 011010 | 001011 | 101101 | 11 | −19 |
| 011011 | 001001 | 101101 | 9 | −19 |
| 011100 | 000111 | 101101 | 7 | −19 |
| 011101 | 000101 | 101011 | 5 | −21 |
| 011110 | 000011 | 101011 | 3 | −21 |
| 011111 | 000001 | 101011 | 1 | −21 |
| 100000 | 111111 | 101011 | −1 | −21 |
| 100001 | 111101 | 101011 | −3 | −21 |
| 100010 | 111011 | 101011 | −5 | −21 |
| 100011 | 111001 | 101101 | −7 | −19 |
| 100100 | 110111 | 101101 | −9 | −19 |
| 100101 | 110101 | 101101 | −11 | −19 |
| 100110 | 110011 | 101111 | −13 | −17 |
| 100111 | 110001 | 101111 | −15 | −17 |
| 101000 | 101111 | 110001 | −17 | −15 |
| 101001 | 101111 | 110011 | −17 | −13 |
| 101010 | 101101 | 110101 | −19 | −11 |
| 101011 | 101101 | 110111 | −19 | −9 |
| 101100 | 101101 | 111001 | −19 | −7 |
| 101101 | 101011 | 111011 | −21 | −5 |
| 101110 | 101011 | 111101 | −21 | −3 |
| 101111 | 101011 | 111111 | −21 | −1 |
| 110000 | 101011 | 000001 | −21 | 1 |
| 110001 | 101011 | 000011 | −21 | 3 |
| 110010 | 101011 | 000101 | −21 | 5 |
| 110011 | 101101 | 000111 | −19 | 7 |
| 110100 | 101101 | 001001 | −19 | 9 |
| 110101 | 101101 | 001011 | −19 | 11 |
| 110110 | 101111 | 001101 | −17 | 13 |
| 110111 | 101111 | 001111 | −17 | 15 |
| 111000 | 110001 | 010001 | −15 | 17 |
| 111001 | 110011 | 010001 | −13 | 17 |
| 111010 | 110101 | 010011 | −11 | 19 |
| 111011 | 110111 | 010011 | −9 | 19 |
| 111100 | 111001 | 010011 | −7 | 19 |
| 111101 | 111011 | 010101 | −5 | 21 |
| 111110 | 111101 | 010101 | −3 | 21 |
| 111111 | 111111 | 010101 | −1 | 21 |

As is further apparent from FIG. 3, curves 42 and 44 approximate sine and cosine curves. These are very useful control signals, however, in practice the memory circuit 24 could contain any relationship and remain with the scope of the present invention.

To meet the requirements of maintaining motor steps of equal size and maintaining equal holding torque, at least two components of the motor's stator induced magnetic field must be changed, i.e. at least two winding currents must be changed continuously. Thus it is apparent from FIG. 3 that position command signal 42 changes while position command signal 44 is between its maximum and minimum levels and vice versa.

Figure 2:
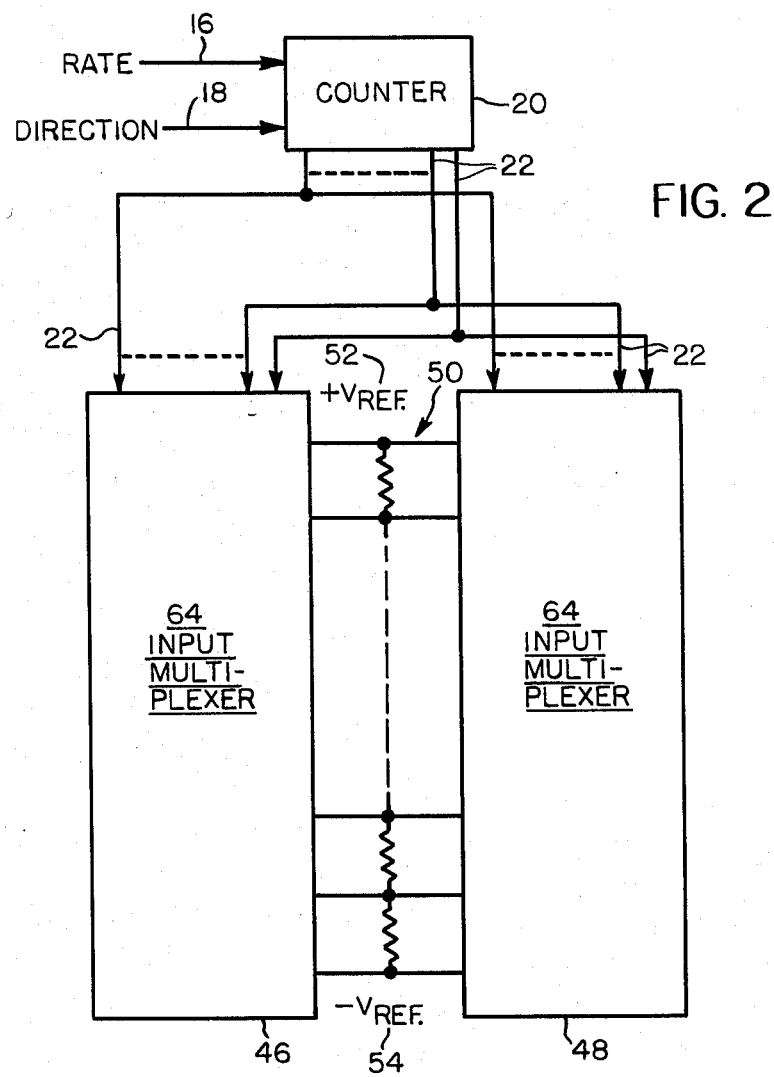
FIG. 2 shows a circuit diagram of a memory circuit suitable for use in the control circuit shown in FIG. 1.

FIG. 2 illustrates an alternative circuit which could be utilized as the memory circuit 24. In this circuit the output signals 22 from the counter 20 are fed to two multiplexing switches 46 and 48, respectively, which in this example, may be sixty-four input multiplexing switches. The switches 46 and 48 are in turn connected to a voltage divider 50 which is connected to positive and negative reference voltages 52 and 54, respectively. Accordingly, the circuit shown in FIG. 2 develops a plurality of digital output signals by selecting from a plurality of discrete direct voltage signals in response to input signals 16 and 18. The multiplexing switches serve as means for selecting a particular one of these discrete voltage signals. By selection of the proper resistance values in the voltage divider 50 and by proper connection of the input switches 46 and 48, the circuits shown in FIG. 2 may produce a digital output pattern which is identical to that shown in Table 1. This may be accomplished by controlling the multiplexing switches 46 and 48 to remain on the same resistance value for a plurality of states of input signals 22, i.e. by utilizing certain zero resistance values in the voltage divider 50. Although the amplifiers 38 and 40 of the circuit shown in FIG. 1 may be linear, it has been found that it is preferable that the amplifiers 38 and 40 be chopping type amplifiers such as the one illustrated in FIG. 4. This amplifier is designed so that in connection with the memory circuit 24 and the input from its associated digital to analog converter, it controls the energization of the motor winding to which it is connected so as to vary the mean current in the winding in steps of equal amplitude.

Stepping motors typically utilize bifilar windings which exhibit the characteristics of a transformer. Thus, for example, in winding 12 when current is flowing out of end 56, a current of equal magnitude is flowing into end 58. The collector of a transistor 60 is connected to end 56 of winding 12 and likewise the collector of a transistor 62 is connected across the collector and emitter of transistors 60 and 62, respectively. The bases of transistors 60 and 62 are connected to turn-on delay circuits 68 and 70, respectively. These delay circuits function to delay a change from low to high, but pass with no delay a change from high to low to thereby prevent the transistors 60 and 62 from conducting simultaneously. These delay circuits could be a simple RC network combined with an AND gate. An inverter is connected across the outputs of delays 68 and 70, respectively. The emitter of transistor 60 is connected through a resistor 74 to ground. Likewise the emitter of transistor 62 is connected through a resistor 76 to ground. The emitter of transistor 60 is also connected through a resistor 78 to the input terminal 80 of a comparitor 82. Likewise, the emitter of transistor 62 is connected through a resistor 84 to the input terminal 86 of comparitor 82. The input terminal 80 of comparitor 82 is also connected to the input from one of the digital to analog converters through a resistor 88. The other input terminal 86 of comparitor 82 is connected to a resistor 90. The output terminal 92 of comparitor 82 is connected to the input of inverter 72 and to resistors 94, 96, and 98. Resistor 98 is also connected to a hysteresis centering reference voltage which may be derived from a D.C. voltage source.

Figure 4:
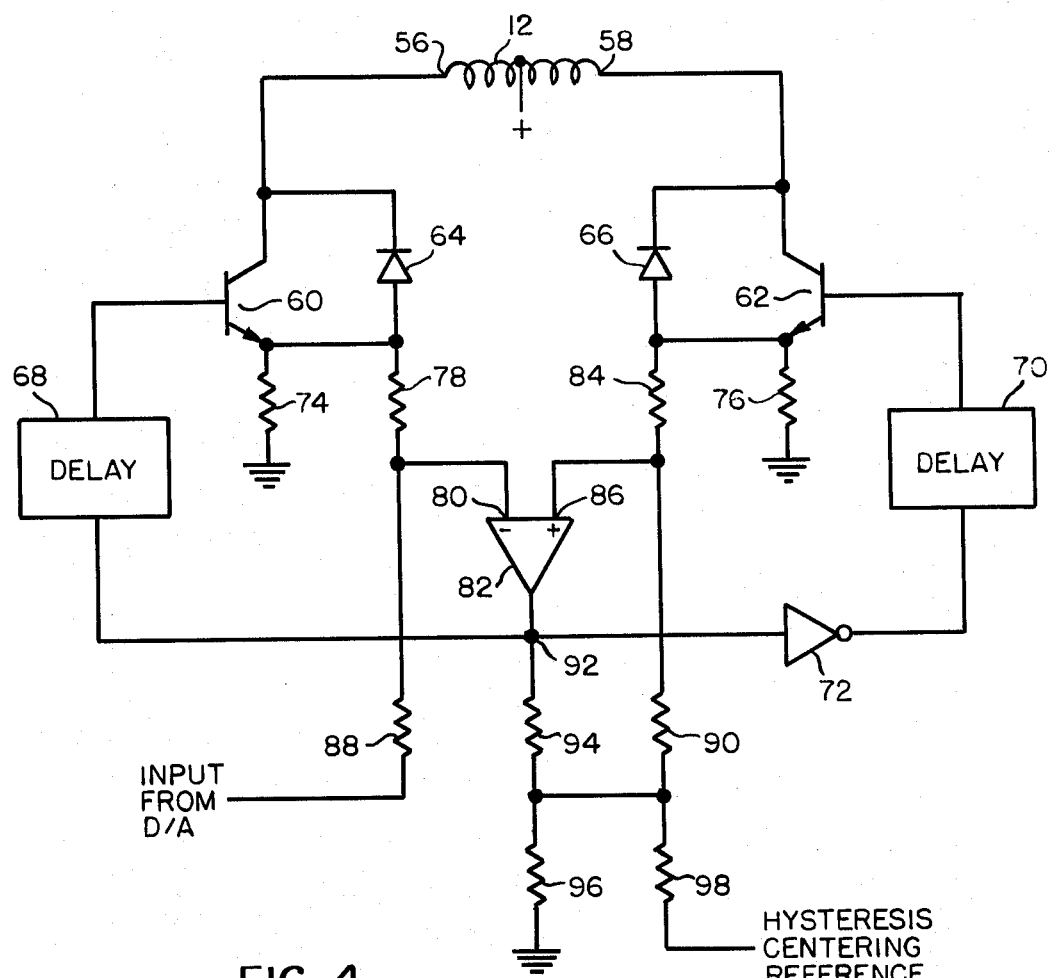
FIG. 4 shows a circuit diagram of an amplifier suitable for use with the control circuit shown in FIG. 1.

In the operation of the amplifier shown in FIG. 4, when the transistor 60 is turned off, current flies back through winding 12 and through diode 66. Since sensing resistors 74 and 76 are preferably equal in value, what had been a positive voltage built up on resistor 74 now becomes a negative voltage on resistor 76. This voltage is essentially equal to the winding current times the resistance 76. Of course, a symmetrical type of operation occurs when transistor 62 is turned off and current flows in the opposite direction.

The output 92 of comparitor 82 is divided and level shifted by a resistor network consisting of resistors 94, 96, and 98. The hysteresis centering reference voltage adjusts the hysteresis swing so that it is of an equal magnitude on each side of zero volts. As was discussed before, the resistors 74 and 76 served to sense the current in motor winding 12. The bridge of resistors 78, 84, 88, and 90 serve to compare the motor winding current with the appropriate position command signal received from a digital to analog converter and the reference voltage obtained from the hysteresis circuit.

As long as the voltage at input terminal 86 is greater than the voltage at input terminal 80, the output of the comparitor 82 is high. This output 92, which is delayed only on the rising edge by delay 68, serves to turn on transistor 60 and simultaneously, by means of inverter 72 and delay circuit 70, turns off transistor 62. At this point in time the current in winding 12 is either flowing through transistor 60 or diode 64. If current is flowing through the transistor 60 then current magnitude is rising; if current is flowing through diode 64, then the current magnitude is decreasing. In either case, however, the voltage at input terminal 80 rises with respect to the voltage at input terminal 86. When the voltage at input terminal 80 exceeds the voltage at input terminal 86, the comparitor 80 switches. Accordingly, transistor 62 is turned on after a delay imposed by delay circuit 70. Then a symmetrical process occurs until the voltage at terminal 86 again exceeds the voltage at terminal 80. Thus, it is apparent that over the entire energization cycle the mean current in winding 12 is proportional to the input position command signal.

It is important to note that the above amplifying and switching process takes place regardless of the level of the input position command signal. This circuit capability is most important when one is trying to provide fine steps close to zero level. Prior art techniques are forced to restrict the current swing from being bipolar, thus placing a greater demand upon switching speed and transistor dissipation of current.

Thus, a new and improved control circuit for a stepping motor has been provided which both minimizes motor resonances and maintains the complexity of the motor exitation circuit independent of the number of steps desired to drive the motor armature. Furthermore, the control circuit of the present invention is effective in maintaining the holding torque at a fairly constant level over the sub-steps within a step. Finally, the control circuit of the present invention is relatively simple and, therefore, inexpensive to manufacture.

Although the invention has been described and illustrated in detail, it is to be clearly understood that the same is by way of illustration and example only, and is not to be taken by way of limitation, the spirit and scope of this invention being limited only to the terms of the appended claims.

What is claimed is:

1. A control circuit for a stepping motor comprising:
    (a) means for receiving an input signal indicative of the desired direction and rate of motor travel,
    (b) means responsive to said input signal for developing a position command signal which is a multi-step function having a maximum and a minimum level, wherein all steps are of equal amplitude but wherein the duration of all steps is predetermined and at least one step between said maximum and minimum levels has a duration which is unequal to that of another step, and
    (c) means responsive to said position command signal for developing an energization signal for said stepping motor.

2. A control circuit as set forth in claim 1, wherein said means for developing a position command signal includes means for developing a plurality of digital output signals in response to said input signal and digital to analog converter means responsive to said digital output for creating said position command signal.

3. A control circuit as set forth in claim 2, wherein said means for developing a plurality of digital output signals comprises logic circuit means having an output state which is directly dependent on said input signal, for developing a digital output signal which varies in response to a first predetermined set of input signals but remains constant in response to a second predetermined set of input signals.

4. A control circuit as set forth in claim 2, wherein said means for developing a plurality of digital output signals comprises means for developing a plurality of discrete direct voltage signals and means responsive to said input signal for selecting a particular one of said discrete voltage signals therefrom.

5. A control circuit as set forth in claim 4, wherein said means for developing a plurality of direct voltage signals includes a direct voltage source and a voltage divider having a plurality of discrete positions connected thereacross and wherein said means for selecting a particular one of said direct voltage signals comprises switch means connected to each of said positions of said voltage divider and means for controlling the state of said switches in response to said input signal.

6. A control circuit as set forth in claim 4, wherein said means for selecting a particular one of said discrete voltage signals will change its selection in response to a first predetermined set of input signals and will remain unchanged in response to a second predetermined set of input signals.

7. A control circuit as set forth in claim 4, wherein said means for developing a plurality of discrete direct voltage signal includes means for developing some signals of equal voltage.

8. A control circuit as set forth in claim 1, wherein said means for developing an energization signal includes amplifier means connected to said motor winding.

9. A control circuit as set forth in claim 8, wherein said amplifier means includes:
 (a) reference voltage generation means for developing a hysteresis centering reference voltage,
 (b) means for receiving said position command signal,
 (c) means for sensing the current in said motor winding and developing a signal indicative thereof, and
 (d) comparitor means responsive to said hysteresis reference voltage, said position command signal, and said motor current for terminating a motor energization cycle.

10. A control circuit as set forth in claim 1, wherein said position command signal approximates a sinusoidal waveform.

* * * * *

UNITED STATES PATENT AND TRADEMARK OFFICE
CERTIFICATE OF CORRECTION

PATENT NO. : 4,087,732
DATED : May 2, 1978
INVENTOR(S) : Eric Pritchard

It is certified that error appears in the above-identified patent and that said Letters Patent are hereby corrected as shown below:

TITLE OF THE INVENTION Cover page and top of Column 1

Delete "DEVICE" and insert therefor -- Drive --.

Column 5, line 9

Delete "outputs" and insert therefor -inputs-

Signed and Sealed this

Thirteenth Day of March 1979

[SEAL]

Attest:

RUTH C. MASON
Attesting Officer

DONALD W. BANNER
Commissioner of Patents and Trademarks